J. C. THOM.
PACKAGE HANDLING AND LABEL PREPARING MECHANISM.
APPLICATION FILED FEB. 28, 1921.
1,414,678.
Patented May 2, 1922.
3 SHEETS—SHEET 3.
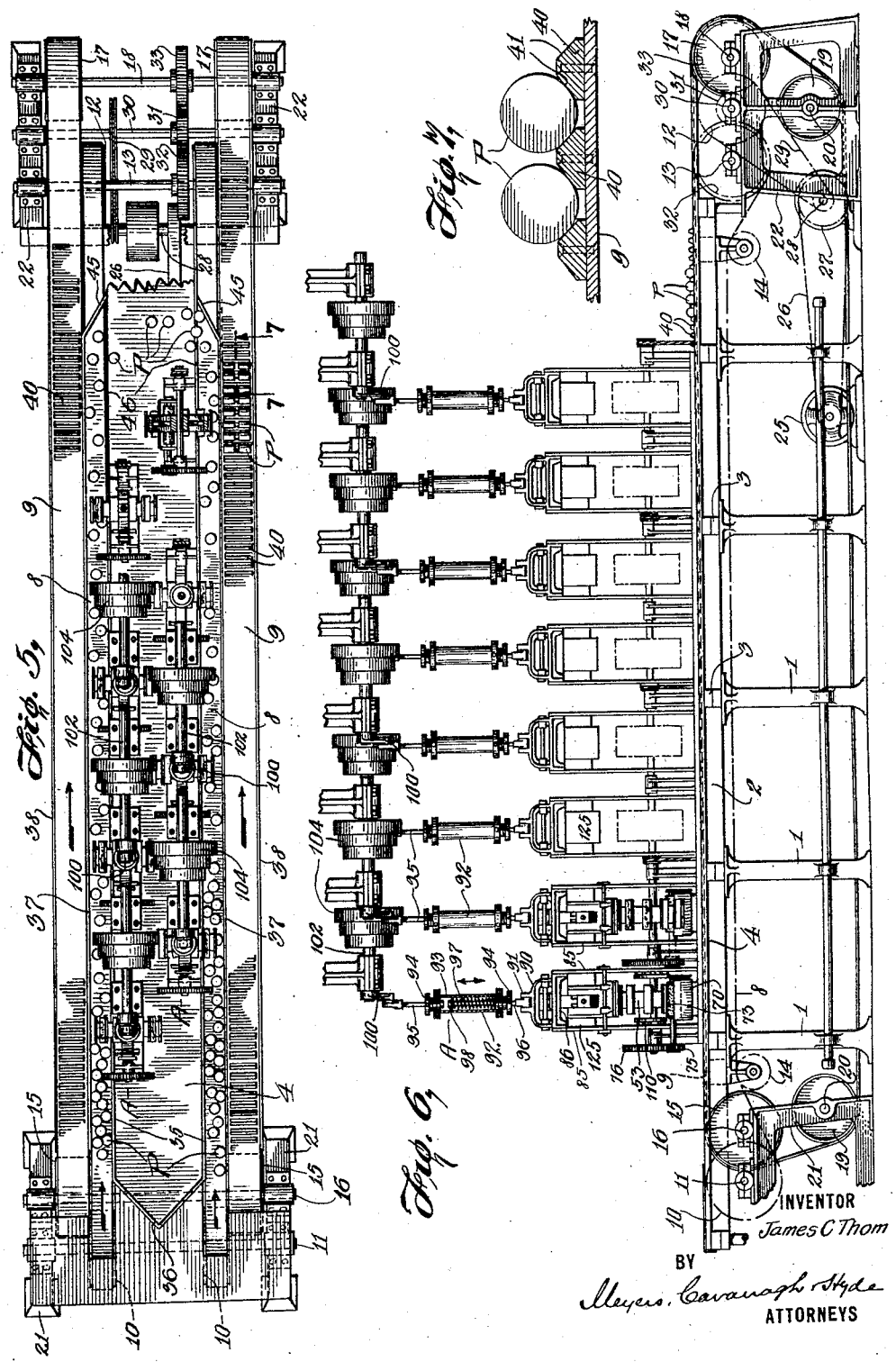
INVENTOR
James C Thom
BY
Meyers, Cavanagh & Hyde
ATTORNEYS

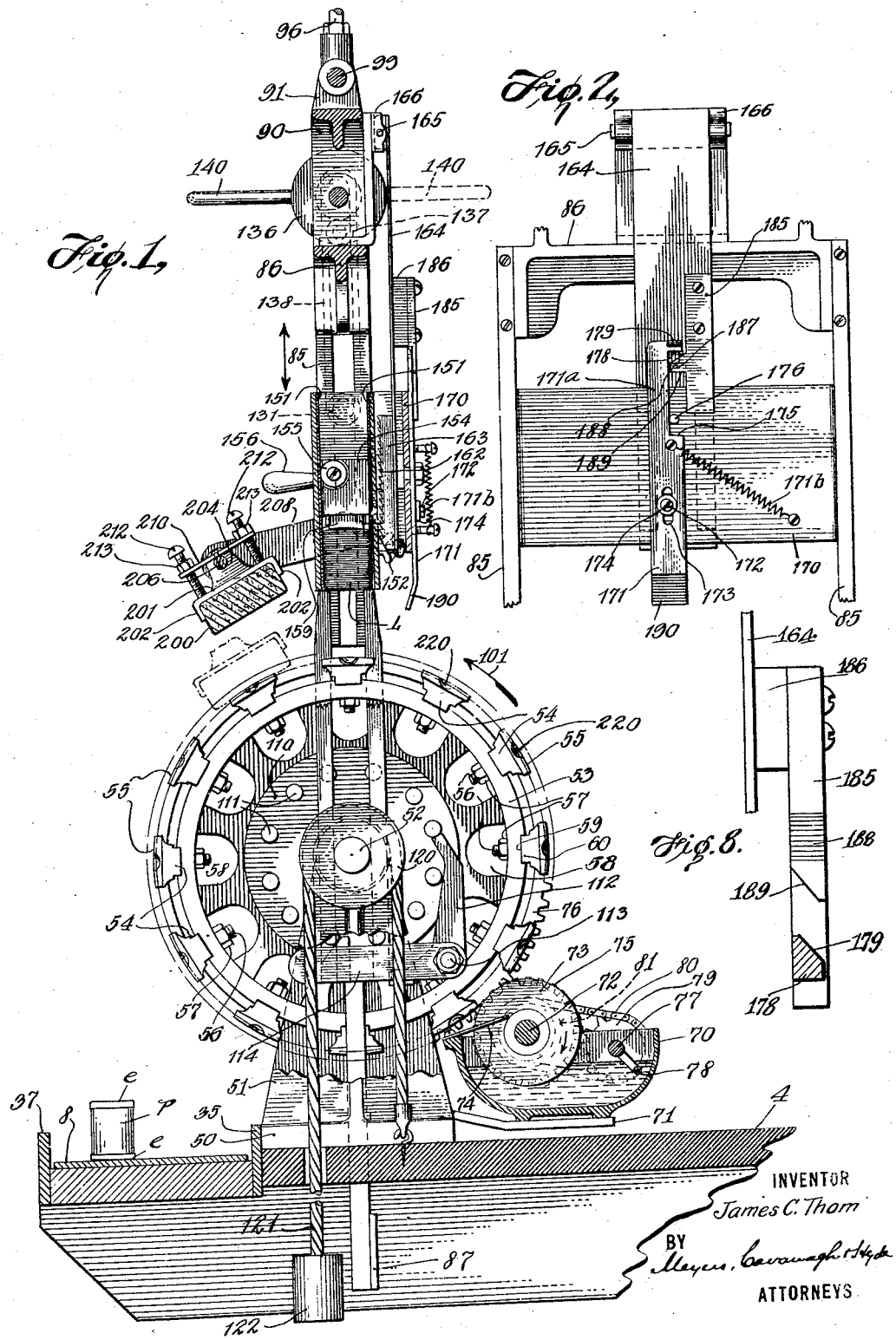

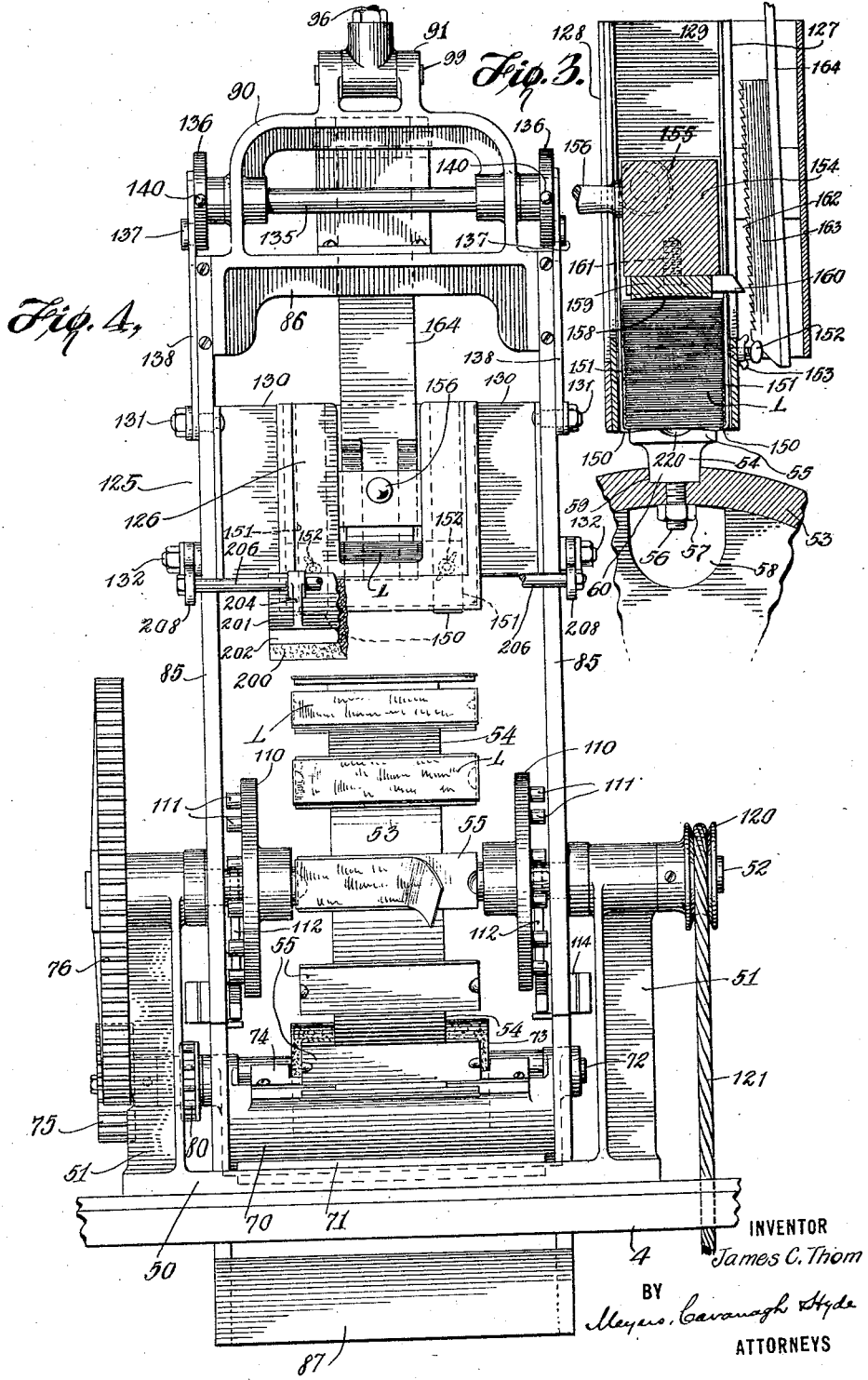

UNITED STATES PATENT OFFICE.

JAMES C. THOM, OF CHICAGO, ILLINOIS, ASSIGNOR TO COMBINATION MACHINE COMPANY, OF NEW YORK, N. Y., A CORPORATION OF DELAWARE.

PACKAGE-HANDLING AND LABEL-PREPARING MECHANISM.

1,414,678.      Specification of Letters Patent.      Patented May 2, 1922.

Application filed February 28, 1921. Serial No. 448,491.

*To all whom it may concern:*

Be it known that I, JAMES C. THOM, a citizen of the United States, and resident of Chicago, in the county of Cook and State of Illinois, have invented certain new and useful Improvements in Package-Handling and Label-Preparing Mechanism, of which the following is a specification.

The general object of the invention is to provide mechanism for rapidly and economically handling a large volume of packages and concurrently preparing labels in suitable number for application to the packages.

The mechanism as here embodied is of a semi-automatic type, that is to say, some of the functions are entirely automatic, and other operations are to be performed by hand, the functions of the machine being intended to immensely facilitate and speed up operations so that the volume of output as compared with purely hand manipulation may be greatly increased.

In the commercial packaging of various commodities, labels of different sorts must be put upon the commodity containers. Automatic machines have been devised for doing this work, for certain classes of containers. While the present mechanism is not limited with respect to the precise class of containers to be handled and labelled, it is especially well adapted for such containers as cylindrical capped cartons and will be so described in the present exemplification; but it is to be understood that the invention may be employed for the handling and labelling of almost any class of packages where conditions are suitable, and where automatic machines are not available or where their use is not desired due to considerations of cost, upkeep expense or other reasons.

The mechanism comprises, in the present exemplification, generally described, supply conveyors for moving packages or containers to operating positions, label preparing mechanisms at one or more, and usually at a multiplicity of operating positions, and delivery conveyers for carrying off the labelled containers. Each label preparing mechanism is automatic in its action and includes means for rapidly applying gum to successive labels and presenting them to an operator, as fast as they can be taken from the preparing device and applied to the packages.

The characteristics of the invention are further sufficiently described in connection with a detail description of the accompanying drawings, which show an exemplifying embodiment of the invention. After considering this embodiment persons skilled in the art will understand that many modifications may be made within the principles of the invention and I contemplate the employment of any structures which are within the scope of the appended claims.

Figure 1 is a view, partly in end elevation, and partly in section, of one of the automatic label preparing mechanisms, Figure 2 is an enlarged detail of label weight operating mechanism, the viewpoint being from the right of Figure 1, Figure 3 is an enlarged vertical section from the same viewpoint as Figure 1 of the label holder and weight operating mechanism and a segment of the gumming wheel.

Figure 4 is a front elevation of Figure 1,

Figure 5 is a plan view of a complete duplex machine comprising two sets of conveyors and two series of labels preparing mechanisms arranged between the pairs of conveyors, Figure 6 is a front elevation of the same, and Figure 7 is an enlarged detail of one of the delivery conveyors.

Fig. 8 is a detail of the label weight operating mechanism.

As shown in Figures 5 and 6, the complete machine desirably comprises legs or uprights 1, longitudinal members 2, and cross pieces 3. The uprights and cross pieces support a central longitudinal table 4 which may have side extensions suitable to support the upper stretches of the different conveyor belts. Running over the table extensions at each side of the machine are the upper stretches of supply belt conveyors 8; and parallel to each supply conveyor and moving close outside of it over the table extension is the upper stretch of a discharge conveyor 9. There is thus provided along each side of the machine a supply conveyor and a discharge conveyor, with the latter, more conveniently, outermost. Conveyors 8 run over forward pulleys 10 carried by shaft 11 and rear pulleys 12, carried by a shaft 13. The return stretches of these conveyors are carried by idler pulleys 14. The upper stretches of conveyors 9 run over forward pulleys 15 on a shaft 16 and rear pulleys 17 on a shaft 18. The return stretches of these conveyors are directed by idler pulleys 19 carried by shafts 20. The various pulley shafts are mounted in bearings carried by frame members 21 and 22 at the front and rear ends of the machine respectively. The conveyors may be driven in any convenient way, for example by an electric motor 25 connected by belt 26 to a pulley 27 on a shaft 28. This shaft is connected by sprockets and a chain 29 to a shaft 30, and this shaft is connected by a pinion 31 to gears 32 and 33 mounted respectively on conveyor shafts 13 and 18.

Two rows of label preparing mechanisms A are located on the central table adjacent to each of the supply belts. Each of these rows comprises a plurality of more or less independent label preparing mechanisms, and the mechanisms of each row are arranged to face outwardly so that their prepared labels are delivered conveniently to operators placed along the sides of the machine, one operator usually being required for each preparing mechanism.

Each preparing mechanism presents a rapid succession of adhesively coated labels L, and the operator removes these labels and places one on each of the packages P, which may differ greatly in character but are, in one form for which the invention is adapted, filled cylindrical cartons having end caps $e$. These cartons are placed on end on the supply belts at the receiving end of the machine (the left in Figure 5) and are advanced by the belts past the different label preparing mechanisms. The cartons may be guided on these conveyors by upright guide rails 35 arranged between the inner edges of the supply belts and the central station and at the receiving end of the machine these ends may be brought together convergently as at 36 to aid in directing to the belts cartons placed on the left-hand end of the table. Other upright guide rails 37 may also be provided substantially between the adjacent edges of the supply and delivery belt and longitudinal upright guide rails 38 may also be arranged along the outer edges of the delivery belts. The upper faces of the delivery belts are desirably provided with means for holding the labelled cartons in horizontal transverse positions, and for this purpose transverse cleats 40 are secured to the belt at regular intervals, and these cleats have angular faces 41, the adjacent faces of each pair of cleats affording a support or socket for at least one and usually two of the cartons, as shown in Figures 5 and 7. As the cartons are advanced in upright positions on the supply belts, past the different label preparing mechanisms, the operators remove them as rapidly as they may be required, and apply a label to each one and then lay the labelled cartons in the first available spaces on the discharge belt, which carries them away to be removed and packed in any desired manner. Any excess cartons which pass the last labelling station on supply belts 8 may be discharged onto the central table by diagonally arranged extensions 45 of guide rails 37, the inner guide rails 35 being discontinued at about the points 46 to provide openings through which the cartons may be pushed by the angular action of guide members 45. These excess cartons may then be removed, to be carried back to the feed end of the machine.

Each of the label preparing mechanisms, (Figures 1 to 4 inclusive) comprises a base 50 having uprights 51. A wheel shaft 52 passes through bearings in the upper ends of the uprights. On the shaft between the uprights is a label wheel 53, to the periphery of which are connected a plurality of regularly spaced label carriers 54, each of which has an outer label receiving and gluing face 55 of area substantially coextensive with that of the label to be handled. These faces are of part-cylindrical contour. Each of the label carriers may desirably be detachably secured, for example by providing the body of the carrier with a screw stud 56 which passes through the wheel periphery and is secured by a nut 57, the central web of the wheel being provided with apertures 58 for this purpose. The proper location of the carriers may be assisted by providing the wheel periphery with transverse sockets 59 to closely fit members 60 of the carrier bodies.

Adjacent to the wheel and usually at the rear thereof is adhesive applying mechanism comprising in a particular example a glue trough 70 carried by an arm 71 extending from base 50. A shaft 72 is mounted in bearings in the ends of this trough and carries a glue roll 73 having a surface of felt, rubber composition, or other suitable material. The periphery of the glue roll dips into glue in the trough and applies the glue to successive engaging gluing surfaces of the label carriers. A scraper 74 may be provided to remove excess glue from the roll. The glue roll is desirably driven by providing its shaft with a pinion 75 engaging a gear 76 on one end of the wheel shaft 52. A glue agitator is desirably provided, comprising a shaft 77 journalled in main walls of the reservoir and provided with a stirring or agitating element 78 and also provided with a sprocket 79 connected by a chain 80 with a sprocket 81 on roll shaft 72.

Cooperating with the label wheel is a vertically reciprocating frame comprising side members 85 connected by an upper cross piece 86, and another cross piece 87 located below table 4. The lower ends of frame members 85 pass through suitable guide slots in the table and in base 50 and these side members are also vertically slotted so that the two portions of each side piece straddle the wheel shaft 52. Upper cross piece 86 has an upward extension 90 provided with a clevis 91 for the connection of a suitable driving device. This driving device in the present embodiment may consist substantially of a yieldable pitman 92 (Figure 6). This pitman comprises a cylindrical casing 93 having adjustable end plugs 94 screwed into the ends of the cylinder. A rod 95 passes through and is secured to the upper plug, and another rod 96 passes slidably through the lower plug and is provided with a spring 97 within the casing compressed between a washer 98 secured on the upper end of the rod and the lower plug 94. Rod 96 is pivotally connected in the clevis 91 by means of a pin 99 and the upper rod 95 is connected to a crank arm 100 on an overhead drive shaft 102.

As shown in Figures 5 and 6 there is a drive shaft 102 corresponding to each of the label preparing mechanisms, the driving shafts being arranged in rows corresponding to the row arrangement of the preparing mechanisms. This arrangement of individual driving shafts is one convenient way of providing crank drives for the individual preparing mechanisms. Desirably each drive shaft carries a stepped pulley 104 and this may be driven from any suitable line shaft.

In each preparing mechanism means are provided for intermittently rotating its label wheel, consisting in the present case of a pin disk 110 carried by shaft 52 and provided with a series of pins 111. The pin disk and pins constitute practically a circular ratchet, and with this cooperates a pawl 112 pivoted at 113 to an arm 114 secured to one of the side members 85 of the reciprocating frame. The pawl is suitably counterweighted or acted upon by a spring to engage it with the pins so that at each upward movement of the reciprocating frame the wheel is rotated one step in the direction of the arrow 101. The ratchet mechanism is, when desired, duplicated at the other side of the label wheel, as shown.

Desirably, means are provided to prevent excess movement of the wheel, consisting in the present case of a friction brake comprising a pulley 120 on shaft 52 and a cord 121 passing over the pulley and secured at one end to table 4 and having its other end passing through a hole in the table and provided with a weight 122.

The reciprocating frame carries label holding and feeding mechanism 125 comprising in the present example, the following: A label box 126 composed of a front wall 127, rear wall 128 and side walls 129, and having its upper and lower ends open, is provided with lateral extensions 130 which have studs 131 and 132 extending through the vertical slots in frame side members 85, so that the label holder can move vertically at times, independently of the reciprocating frame. The holder and frame are connected by a shaft 135 passing through bearings in frame extension 90 and provided at the ends with circular plates 136 having crank pins 137. These pins are connected by links 138 with studs 131.

Plates 136 are also provided with handles 140. Normally the handles, crank pins and connecting links are in the position shown in the drawings, corresponding to the feeding position of the label holder; but if at any time it is desired to discontinue label feed, without discontinuing the drive of the reciprocating frame, either of the handles 140 is moved upward, which elevates the label holder in relation to the movable frame and prevents label feeding engagement with the wheel label carriers 54.

A stack of labels L is placed in the label box and is most desirably supported by inturned hooks or fingers 150 carried by vertical blades or spring strips 151 arranged against the front and rear walls of the box. Usually there are two of these spring strips and fingers adjacent to each wall of the box, as best indicated in Figure 4. The fingers adjacent to at least one of the walls are desirably adjusted to regulate their retaining effect upon the labels, by screws 152 passing through the front wall of the box and secured by lock nuts 153. A weight 154 is slidably arranged within the box. This bears upon the top of the label stack and its free movement may be facilitated by suitable means, such as one or more rollers 155 journalled in the weight and bearing against adjacent box walls. The weight may be desirably provided with a handle 156 projecting through a slot in the rear wall of the box, so that the weight may be easily withdrawn to replenish the stack. The member which actually bears upon the top of the label stack, in this case the bottom of pawl-block 159 described below, desirably has a concave surface 158, so that greatest pressure is applied to the ends of the stack which rest on hooks 150, and also to aid in conforming the delivered label to the receiving surface of the label carrier.

The action of the weight 154 is desirably regulated by means such as the following: A pawl-block 159 carrying a pawl 160 is detachably connected by a screw 161 to the lower end of the weight. The pawl extends through a slot in the front wall of the box and is confronted by two rows of ratchet teeth 162 formed on ratchet plates 163 carried by a vertical strip 164 secured at 165 to a bracket 166 on upper cross members 86 and 90 of the reciprocating frame. The strip 164 may be of spring metal, so that it tends to resiliently move to engage the ratchet teeth with the pawl after they have been displaced therefrom. A transverse plate 170 is connected at its ends to frame side members 85 and this plate overlies the lower end of strip 164. A ratchet operating lever 171 is connected to plate 170 for relative vertical and pivotal movement by a screw stud 172 passing through a slot 173 in the lever and engaging in plate 170. This stud is provided with a washer 174 overlying the sides of the slot, to retain lever 171 against outward displacement. The upper end 171ᵃ of the lever is of reduced width, forming a shoulder at 175, and a pin 176 fixed in plate 170 acts as a stop for member 171, both by cooperation with the shoulder and the vertical edge of the lever member 171ᵃ. The lever is acted upon by a spring 171ᵇ, which serves to retract the lever downward, and also pivotally against stop 176. The upper end of member 171ᵃ has a lateral projection 178 and the upper edge of this has an upwardly and inwardly directed bevelled face 179. A plate 185 secured to vertical strip 164 cooperates with member 171. This plate is spaced away from strip 164 by a block 186 and has a lateral projection 187 provided with a bevelled upper face 188 and a downwardly and outwardly bevelled inner face 189 to cooperate with the bevelled face 179 of extension 178. The lower end 190 of member 171 is arranged so that as the reciprocating frame nears its lowermost position and the lower end of the label box engages with the label carrier 54 which is positioned beneath it, the end 190 of lever 171 engages the periphery of the label wheel and the member is thus prevented from moving farther down as the frame continues to descend. The bevelled face 179 of member 171ᵃ thereupon runs under the inclined inward face 189 of plate 185 and this moves vertical strip 164 outward and releases ratchet teeth 162 from pawl 160 and permits the full load of weight 154 to be imposed upon the label stack. The lowermost label is thus pressed firmly upon the adhesive surface of the carrier and the combined effect of the weight and adhesion of the label causes the lowermost label to be pulled away from hooks 150 as the label box again rises, leaving the label attached to the surface of the carrier. At about this moment lever 171 is in the position shown in Figure 2; that is, its offset portion 178 has passed away from projection 187 of plate 185 and ratchet teeth 162 are reengaged with pawl 160 so that on the upward movement of the reciprocating frame the weight is largely or entirely supported by the ratchet and any undue force cannot be exerted by the weight upon the label stack. After the lower end 190 of lever 171 is free from the wheel, the member is pulled back by spring 171ᵇ to normal position, and in this movement its upper end is forced outward by bevelled face 188 of plate 185 and after projection 178 passes the end of projection 187, lever 171 springs back to vertical position again with its bevel face 179 ready to act upon inner surface 189 of plate 185 at the next descending movement of the movable frame.

The bottom label in the stack is thus applied at each descending movement of the frame to the adhesive base of the label carrier which is in uppermost position at the time. At the upward movement of the holder the label is withdrawn from hooks 150 and remains in position on the carrier. Wheel 53 is advanced one step and the label is then pressed upon the carrier to insure application of glue to its entire under surface by a suitable device, which in the present instance is a pad 200 which may be of felt, rubber composition or other suitable compressible material. This is carried by a plate 201 having flanges 202 and also having ears 204 through which a supporting rod 206 passes. The rod is carried by arms 208 projecting from side frame members 85. A cross piece 210 is rigidly secured to the rod, and this is provided with screws 212 having lock nuts 213, so that the angle of the pad can be properly adjusted. At each downward stroke of the moving frame, the pad presses a label in position as shown in dotted lines in Figure 1.

The outer faces of the label carriers are desirably provided with depressions 220 at the ends to facilitate the grasping and removal of the labels.

As the operators handle packages or cartons in the manner previously described, the label preparing mechanisms continually present a succession of gummed labels which may be easily and quickly removed from their carriers and applied to the packages.

I claim:

1. In package handling mechanism, a row of label preparing mechanisms and parallel package conveyors common to all of said mechanisms and moving at one side of said row and in juxtaposition thereto.

2. In package handling mechanism, a row of label preparing mechanisms and parallel package conveyors common to all of said mechanisms and moving at one side of said row and in juxtaposition thereto; one of the conveyors having spaced transverse members providing article holding sockets.

3. In package handling mechanism, a row of label preparing mechanisms and parallel package conveyors common to all of said mechanisms and moving at one side of said row and in juxtaposition thereto; the upper surface of one of the conveyors being provided with equally spaced transverse cleats.

4. In package handling mechanism, a row of label preparing mechanisms and parallel package conveyors common to all of said mechanisms and moving at one side of said row and in juxtaposition thereto; the upper surface of one of the conveyors being provided with equally spaced transverse cleats having diagonal adjacent faces.

5. In package handling mechanism, label preparing mechanism, parallel package conveyors moving at one side of the preparing mechanism and in juxtaposition thereto, and a guide rail between the conveyors.

6. In package handling mechanism, a row of label preparing mechanisms, parallel package conveyors common to all of said mechanisms and moving at one side of said row and in juxtaposition thereto, and a guide rail between the conveyors.

7. In package handling mechanism, a table, a row of label preparing mechanisms thereon, two conveyors moving substantially at the table level at one side of the preparing mechanism row, and guiding devices to move articles carried by the inner conveyor past the last preparing mechanism onto the table.

8. In package handling mechanism, a table, a row of label preparing mechanisms thereon, two conveyors moving substantially at the table level at one side of the preparing mechanism row, guiding devices to move articles carried by the inner conveyor past the last preparing mechanism onto the table and means for driving the preparing mechanisms individually.

9. In package handling mechanism, a table, two rows of label preparing mechanisms thereon, two conveyors moving substantially at the table level at each side of the table, and guiding devices to move articles carried by the inner conveyor past the last preparing mechanism onto the table.

10. In package handling mechanism, a table, a row of label preparing mechanisms thereon, two conveyors moving substantially at the table level at one side of the preparing mechanism row, a guide rail along the inner margin of the inner conveyor, and an angular guide member leading to the feed end of the guide rail.

11. In package handling mechanism, a table, two rows of label preparing mechanisms thereon, two conveyors moving substantially at the table level at each side of the table, guide rails along the inner margins of the inner conveyors, and angular guide members leading to the feed ends of the guide rails.

12. In package handling mechanism, a table, a series of label preparing mechanisms thereon, and two parallel conveyors at each side of said series adapted to move articles to be labelled to and away from the preparing mechanisms.

13. In package handling mechanism, a table, two rows of label preparing mechanisms thereon, and two parallel conveyors running in front of each row adapted to move articles to be labelled to and away from the preparing mechanisms.

14. In package handling and labeling mechanism, in combination with a table and a conveyor, a row of label preparing mechanisms each comprising a rotating member provided with spaced label carriers, means for applying adhesive to the carriers, and means for applying a label to each successive adhesive carrier surface.

15. In package handling and labeling mechanism, in combination with a table and a conveyor, a row of label preparing mechanisms each comprising a rotating member provided with spaced label carriers, means for applying adhesive to the carriers, means for applying a label to each successive adhesive carrier surface and means for pressing the labels in position.

16. Label preparing mechanism, comprising a wheel, a plurality of label carriers thereon, means for applying adhesive to an outer surface of each carrier, a reciprocating frame, a label holder thereon, a weight movably mounted in the holder and resting on a stack of the labels in the holder, and means to control the action of the weight.

17. Label preparing mechanism, comprising a wheel, a plurality of label carriers thereon, means for applying adhesive to an outer surface of each carrier, a reciprocating frame, a label holder thereon, having an open bottom and having inwardly projecting label holding fingers, a weight movably mounted in the holder and resting on a label stack therein, means to connect the weight with the frame and means for releasing the weight substantially concurrently with application of a label to the carrier.

18. Label preparing mechanism, comprising a wheel, a plurality of label carriers thereon, means for applying adhesive to an outer surface of each carrier, a reciprocating frame, a label holder movably arranged thereon, a weight in the holder resting on the label stack, a pawl on the weight, a ratchet cooperating with the pawl and movably connected to the frame, and means for releasing the ratchet from the pawl substantially concurrently with application of labels to the carriers.

19. Label preparing mechanism, comprising a wheel, a plurality of label carriers thereon, means for applying adhesive to an outer surface of each carrier, a reciprocating frame, a label holder, a weight in the holder resting on the label stack, a pawl on the weight, a ratchet to cooperate with the pawl movably connected to the frame, and means for releasing the ratchet from the pawl substantially concurrently with application of labels to the carriers.

20. In label preparing mechanism, a rotatable label wheel, spaced label carriers thereon, means for applying adhesive to outer faces of the carriers, a reciprocating frame, a label holder thereon, and means carried by the frame and wheel respectively for intermittently rotating the latter.

21. Label preparing mechanism comprising a rotatable wheel, spaced label carriers thereon, means for applying adhesive to the carriers, a reciprocating frame, a label holder thereon, a driving crank, and a yieldable pitman connecting the crank and reciprocating frame.

22. Label preparing mechanism, comprising a rotatable wheel, spaced label carriers thereon, means for applying adhesive to the carriers, means for intermittently rotating the wheel, a reciprocating frame, a label holder thereon, a driving crank, and a yieldable pitman connecting the crank and reciprocating frame.

23. Label preparing mechanism, comprising a rotatable wheel, spaced label carriers thereon, means for applying adhesive to the carriers, a reciprocating frame, a label holder thereon, a driving crank, a yieldable pitman connecting the crank and reciprocating frame; said pitman comprising a sleeve, a stem fixed to the sleeve at one end, a stem passing movably through the other end of the sleeve, and a spring about the stem within the sleeve.

24. Label preparing mechanism, comprising a rotatable wheel, spaced label carriers thereon, means for applying adhesive to the carriers, means for intermittently rotating the wheel, a reciprocating frame, a label holder thereon, a driving crank, and a yieldable pitman connecting the crank and reciprocating frame; said pitman comprising a sleeve, a stem fixed to the sleeve at one end, a stem passing movably through the other end of the sleeve, and a spring about the stem within the sleeve.

25. In label preparing mechanism, a rotatable carrier wheel, gumming means, a reciprocating frame, a label holder thereon, a label stack weight within the holder, a pawl on the weight, a ratchet cooperating with the pawl and movably connected with the frame, a plate connected to the ratchet and having angular faces, and a lever mounted to have vertical and pivotal movement in relation to the frame and having a member arranged to cooperate with the angular faces of said plate.

26. In label preparing mechanism, a rotatable carrier wheel, gumming means, a reciprocating frame, a label holder thereon, a label stack weight within the holder, a pawl on the weight, a ratchet cooperating with the pawl and movably connected with the frame, a plate connected to the ratchet and having angular faces, a lever mounted to have vertical and pivotal movement in relation to the frame and having a member arranged to cooperate with the angular faces of said plate, and a spring for retracting the lever.

Signed at Chicago, in the county of Cook and State of Illinois, this 23rd day of February, A. D. 1921.

JAMES C. THOM.